April 10, 1956     B. D. RUSSELL     2,741,138
LOCKING TYPE VALVE
Filed Oct. 11, 1952     2 Sheets—Sheet 1
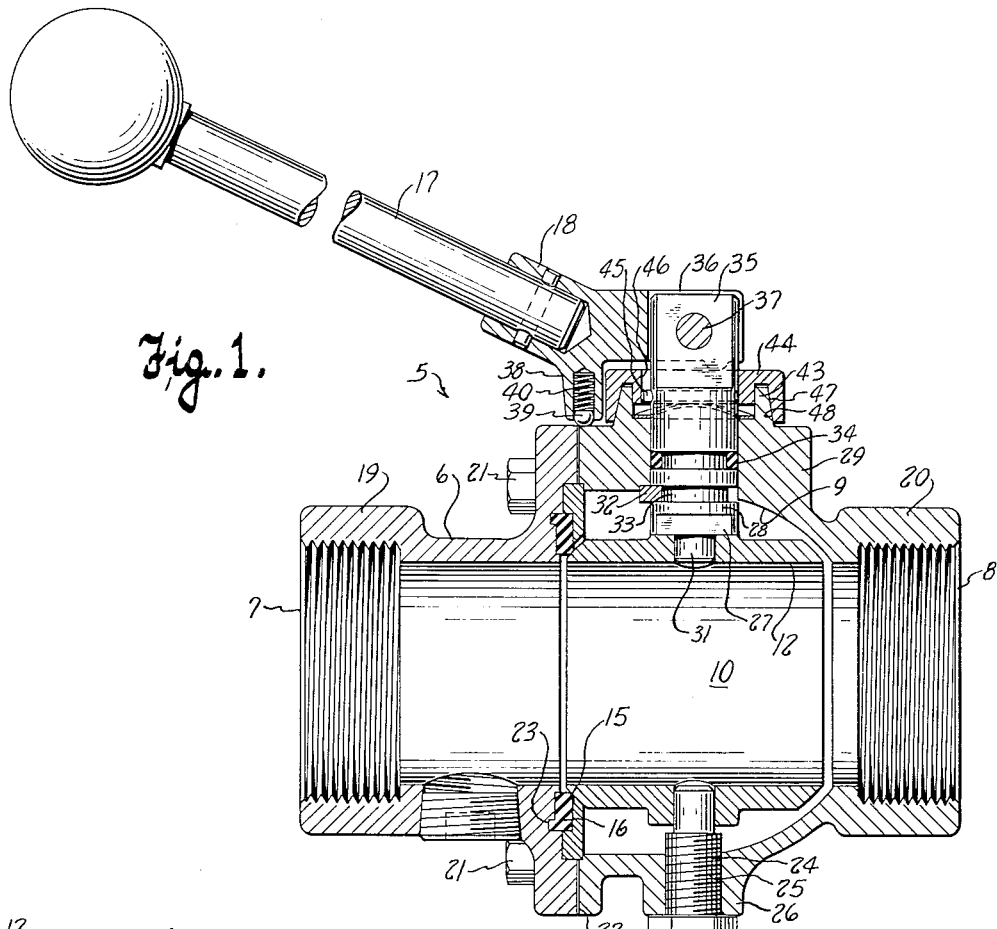
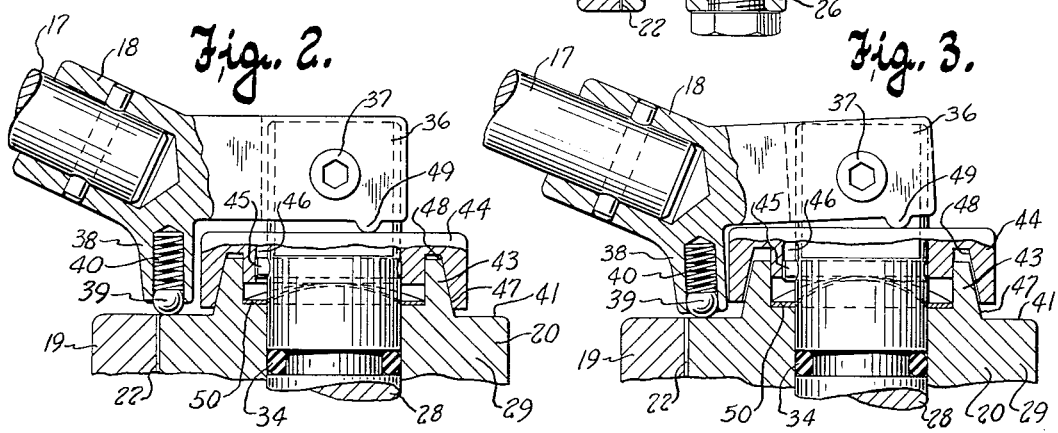
Inventor
Bennett D. Russell April 10, 1956 B. D. RUSSELL 2,741,138
LOCKING TYPE VALVE
Filed Oct. 11, 1952 2 Sheets-Sheet 2

Inventor
Bennett D. Russell
By Ira Milton Jones
Attorney

# United States Patent Office 2,741,138
Patented Apr. 10, 1956

2,741,138

LOCKING TYPE VALVE

Bennett D. Russell, Elkhart, Ind., assignor to Elkhart Brass Manufacturing Company, Inc., Elkhart, Ind., a corporation of Indiana Application October 11, 1952, Serial No. 314,280

4 Claims. (Cl. 74—531)

This invention relates to valves of the type having a rotatably adjustable valve element and refers more particularly to a device for readily releasably locking the valve element of such a valve against creeping away from the position to which it is adjusted.

Valves of the type here under consideration comprise a valve body with inlet and outlet ports at opposite sides of the body and connected by a passage through the body, and a plug-like valve element in the passage which is rotatable between a closed position, in which the valve element blocks the flow of fluid through the passage, and an open position in which a bore through the valve element aligns with the passage in the valve body to permit fluid to flow from the inlet to the outlet. The valve element may comprise either a substantially cylindrical plug or a substantially spherical one, but in either event the valve element or plug is rotatable on an axis transverse to the axis of the passage in the valve body to enable it to be swung to its open and closed positions; and it is adjustingly actuated by a member, such as a hand wheel or lever, mounted at the exterior of the valve body. For the sake of simplicity, the discussion herein will be confined to valves having a substantially spherical valve element or plug—so called ball valves—but it is to be understood that what is said herein of ball valves applies equally well to valves of any other type having a rotatable valve element, and the device of this invention is equally applicable to any of such valves.

Ball valves and the like have frequent application in breweries, dairies, chemical plants and similar installations, wherein they are called upon to control the flow of large volumes of fluid under high pressures. Although the problem to which this invention is directed exists in ball valves used in all such industrial installations as those just named, it is particularly troublesome in ball valves used in fire fighting apparatus. Ball valves employed on fire department equipment, such as tankers and pumpers, are not only required to control the flow of water under extremely high pressure—in many cases attaining values as great as 300 pounds per square inch—but they are also subjected to constant and relatively severe vibration when in use.

As a result of these two factors of high pressure and constant vibration, ball valves used in fire fighting equipment have a marked tendency to creep away from whatever position they may be set at—usually toward a valve closed position. This is true of such valves even when they are set at their fully open position. Obviously this characteristic is extremely troublesome and, in fire apparatus, may even be disastrous.

With this serious problem in mind it is an object of this invention to provide a simple and compact locking device for restraining the plug or valve element of a ball valve or the like against its tendency to creep away from the position of adjustment in which it may be set.

More particularly it is an object of this invention to provide such locking device in which simple depression of the valve actuating member will disable the lock, so that the normal weight of an operator's hand on the actuating lever or handle of the valve will be aequate to release it and enable the valve element to be freely adjusted.

It is another object of this invention to provide a readily releasable locking device of the character described which will be extremely simple and rugged in construction so that both initial cost and maintenance problems will be at a minimum.

A further object of this invention resides in the provision of a readily releasable valve locking device of the character described wherein locking of the valve element against undesired rotation is accomplished by braking engagement between complementary conical surfaces on a pair of annular brake members concentric with the axis of rotation of the valve element so that the locking action is uniformly effective in any position of adjustment of the valve element.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 1 is a longitudinal sectional view through a ball valve embodying the locking device of this invention;

Figure 2 is a side view of the locking device in its locked condition, portions thereof being cut away and shown in section;

Figure 3 is a view similar to Figure 2 but showing the locking device in its unlocked condition;

Figure 4:
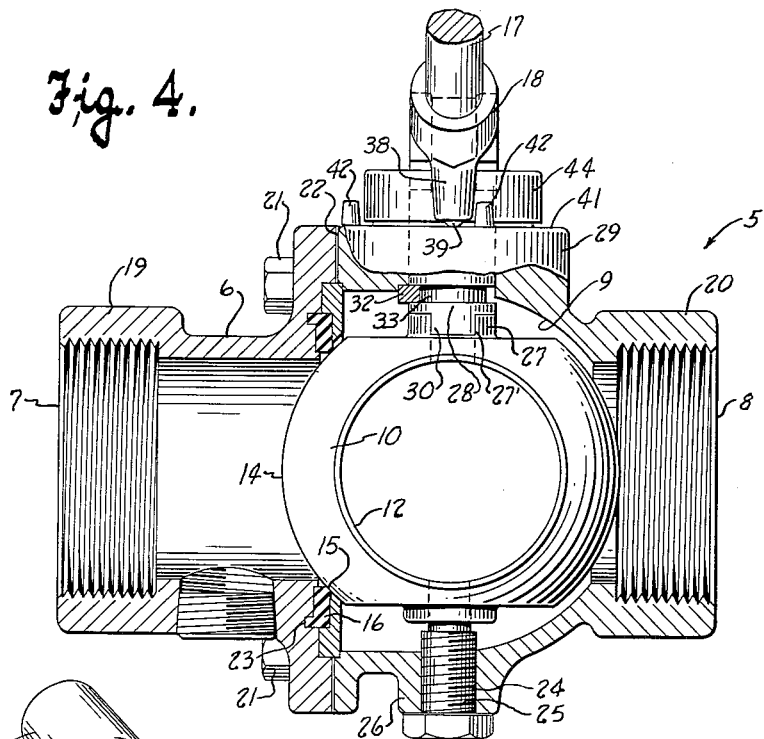
Figure 4 is a view similar to Figure 1 but with the rotatable valve element or plug in its closed position.
Figure 5:
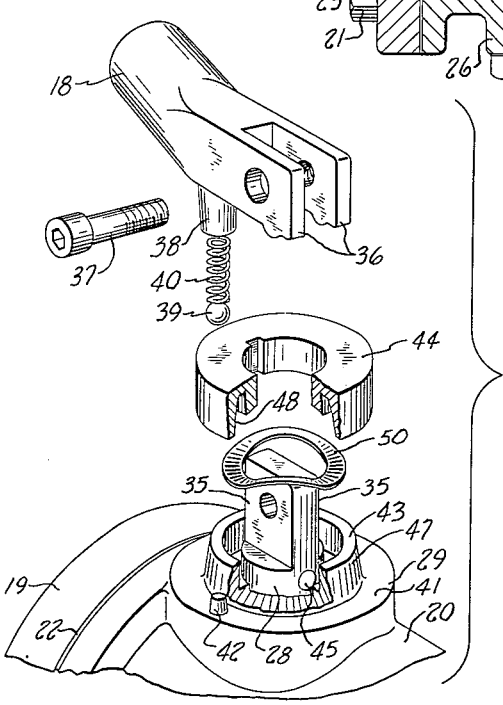
Figure 5 is an exploded perspective view of the locking device of this invention, with portions of the complementary brake members broken away.

Referring now more particularly to the accompanying drawings in which like numerals designate like parts throughout the several views, the numeral 5 designates generally a ball valve comprising a hollow valve body 6 having at its opposite sides an inlet port 7 and a coaxial outlet port 8, both of which open to a valve chamber 9 in the interior of the body, and both of which are threaded or otherwise provided with appropriate means for connecting the valve in the line in which it is to be used.

A movable valve element or plug 10 is mounted in the valve chamber for rotation between a valve open position, illustrated in Figure 1, and a valve closed position, illustrated in Figure 4. In the fully open position of the plug a bore 12 which extends therethrough transversely to its axis of rotation aligns with the inlet and outlet ports in the valve body and thus defines an unrestricted passage from the one port to the other through which fluid may flow freely. It will be observed that a valve of this type, when fully open, permits a straight-through flow which is highly desirable where large volumes of fluid at high pressures and rates of flow must be controlled.

During movement of the valve element or plug from one position to the other a spherical surface 14 thereon slides across a valve seat 15, and in the fully closed position of the valve element or plug this spherical surface coacts with the valve seat to block all flow through the valve. The valve seat preferably comprises a sealing ring 16 of resilient material, such as neoprene or the like, and because the surface 14 of the plug is spherical it will be seen that the ring may lie in a single plane, assuring a good sealing engagement between it and the plug.

The plug may be adjustingly rotated on an axis transverse to the bore 12 therethrough by means of an actuating member which in this instance comprises a handle 17 extending from a lever 18.

The valve body is preferably formed as a pair of castings, one an inlet section 19 and the other an outlet section 20, which are secured to one another in a well known manner by means of a circle of bolts or studs 21. A gasket 22 clamped between the two sections of the valve body seals the junction therebetween and also serves to hold the sealing ring 16 in a locating groove 23 in the inlet section. Attention is directed to the fact that the gasket, which is of course annular, has a larger inside diameter than has the resilient sealing ring, thus exposing the inner marginal edge portion of the resilient ring to the valve chamber 9 to provide the valve seat 15.

Attention is also directed to the fact that the valve chamber 9 lies entirely within the outlet section of the valve body, with its maximum diameter at the junction of the two body sections; and as the description proceeds it will be apparent that because of this fact the plug may be readily assembled into the valve chamber before the inlet section of the valve body is secured thereto.

At its bottom side the plug is freely rotatably supported by a bolt-like trunnion 24, the threaded shank 25 of which screws through a boss 26 on the bottom of the outlet section of the valve body. It will be observed that the plug is so mounted in the valve chamber that it has limited freedom for up and down translatory motion to thus enable the spherical face of the plug to center itself on the sealing ring, thereby assuring perfect sealing engagement at all times between the valve seat 15 and the plug.

At its upper side, opposite the trunnion 24 and coaxial therewith, the plug has a transversely slotted boss 27, and a shaft or stem 28, rotatably journaled in a bore through a boss 29 on the upper side of the outlet section of the valve body, has a transverse tongue 30 near its inner end which engages in the T-slot 27' in the plug to constrain the plug and shaft to rotate in unison. The inner end portion 31 of the shaft has a reduced diameter and is piloted in a closely fitting hole in the plug, opening to its bore 12. Except for the fact that the shaft and plug have limited relative endwise motion to give the plug perfect freedom to align itself with the valve seat, the shaft for all purposes is a valve stem connecting the plug with its handle.

The shaft 28 is restrained against axially outward displacement by means of a key 32 suitably secured at the interior of the valve body and projecting into a circumferential slot 33 in the shaft. A resilient O-ring 34, seated in a circumferential slot in the shaft spaced above the slot 33, engages the wall of the bore in which the shaft is journaled to prevent leakage of fluid out of the valve chamber.

The outer end portion of the shaft extends above the housing a substantial distance and is slabbed off as at 35 to fit between arms 36 formed on the inner end of the lever 18 by bifurcating the same. A pin 37 extending through these arms of the lever and transversely through the shaft extension mounts the lever on the extension in such a manner that the shaft is constrained to rotate in consequence of horizontal swinging movement of the lever about the shaft axis while at the same time the lever is free to rock up and down about the pin axis to carry the ends of the lever toward and from the valve body. This rocking action of the lever effects engagement and disengagement of a pair of brake elements by which the shaft, and hence the plug, is restrained against undesired rotation, as will be seen from the description which follows.

The handle 17 comprises in effect an extension of the end of the lever remote from its arms 36 and facilitates both swinging and rocking actuation of the lever.

The lever has a downwardly extending boss 38 spaced from its pivot axis toward the handle 17, and a ball follower 39 and compression spring 40 are received in a downwardly opening well in the boss. The ball follower rides on an upwardly facing annular track 41 provided by the top of the boss 29, and the spring reacts between the ball and the bottom of the well to bias the lever about its pivot axis in a direction to rock the bifurcated end of the lever toward the housing.

The fully open and fully closed positions of the valve element are defined by the engagement of the boss 38 on the lever with stop abutments 42 projecting above the surface of the annular track 41.

The brake elements by means of which the valve element is normally locked against creeping comprise, respectively, a neck 43 fixed on the valve body and extending upwardly from its upper boss 29 concentrically with the shaft and a collar 44 snugly embracing the shaft between the neck 43 and the lever and slidably splined to the shaft by means of a pin 45 riding in a keyway 46. Hence the collar turns with the shaft but is free to move axially as the space between the lever and the neck permits.

The neck 43 is spaced radially from the shaft and its outer annular surface 47 is conical and tapers upwardly to be complementary to and frictionally grip the correspondingly tapered conical inner surface 48 of the collar. The conical surfaces of the neck and collar, i. e. the cooperating stationary and movable brake elements, are thus mutually engageable, and to increase the area of these complementary conical surfaces without objectionably increasing the axial height of the collar or detracting from the area of its bearing upon the shaft, the underside of the collar is annularly grooved to receive the neck.

The collar 44 is normally biased downward into braking engagement with the neck 43 by means of the lever 18, the bifurcated end of which, as explained above, is urged downwardly toward the housing by the spring 40. Bias upon the lever is imparted to the collar through a pair of lobe-like cams 49, one on the bottom of each arm 36 of the lever, spaced from the pivot axis of the lever and engaging the top of the collar, and since the taper of the complementary conical surfaces on the collar and the neck is relatively small and the collar is splined to the shaft, any tendency of the valve plug to rotate will be effectively resisted by the brake elements so long as the arm 17 is not depressed.

However, upon depression of the handle 17 and the consequent rocking of the lever 18 against the bias of the spring 40, the lobe-like cams 49 are lifted to thus free the collar for upward axial movement out of braking engagement with the neck 43. Such upward movement is imparted to the collar by a spring 50 interposed between the underside of the collar and the top of the boss 29. This spring 50 is preferably of annular undulated formation to exert a balanced upward force upon the collar at opposite sides of the shaft to assure prompt release of the brake upon depression of the handle 17; and, of course, is weaker in its effect upon the collar than the spring 40 so that as long as the handle 17 is not depressed the spring 50 is ineffective. In turn, the biasing force exerted upon the lever 18 by the spring 40 is such that it may be overcome by the mere weight of an operator's hand upon the end of the handle 17, so that disabling of the lock device does not require any conscious act or effort on the part of a person intending to adjust the valve.

From the foregoing description, together with the accompanying drawings, it will be readily apparent that this invention provides a simple, rugged and inexpensive device for locking the valve element of a ball valve or the like against any tendency to creep away from the position to which it is adjusted, and that the lock of this invention may be disabled or released by the mere weight of an operator's hand imposed upon the valve actuating member during adjustment of the valve.

What I claim as my invention is:

1. In a device of the type in which a shaft which is journaled in a body but is constrained against axial movement with respect to the body and has an end portion projecting from the body may be rotated by means of a handle, means for readily releasably locking the shaft against rotation away from any position of adjustment at which it may be set, comprising: a pivotal connection between the handle and said end portion of the shaft by which torque applied to the handle is transmitted to the shaft while permitting limited rocking movement of the handle toward and from the body; a pair of cooperating stationary and movable annular brake elements encircling the shaft between the handle and the body, the stationary brake element comprising a neck projecting from the body and having a conical surface facing away from the body, the movable brake element comprising a collar slidably splined on the projecting end portion of the shaft with a portion thereof in telescoping relation with the neck, said portion of the collar having an annular conical surface complementary to the conical surface of the neck and facing the body so that said conical surfaces are engageable by movement of the collar towards the body and separable by movement of the collar away from the body; a connection between the handle and the movable brake element through which movement of the handle away from the body about its pivotal connection with the shaft forces the movable brake element towards the body; and a brake engaging spring reacting between the body and the handle and yieldingly biasing the handle away from the body to thus normally maintain the brake elements in engagement, said spring being readily overcome to free the shaft for rotation by slight pressure upon the handle preparatory to manipulation thereof.

2. In a device of the character described, the structure set forth in claim 1, but wherein the collar which provides the movable brake element has a bore of a diameter to snugly but freely slidably receive the portion of the shaft it encircles, and further has an annular groove in its side which faces the body; wherein the neck projecting from the body is a ring received in said annular groove; and the complementary conical surfaces of the neck and collar respectively are the outside of the neck and the radially inwardly facing side of the annular groove.

3. In a device of the type in which a shaft which is journaled in a body but is constrained against axial movement with respect to the body, and has an end portion projecting from the body may be rotatad by means of a handle, means for readily releasably locking the shaft against rotation away from any position of adjustment at which it may be set, comprising a pivotal connection between the handle and said end portion of the shaft by which torque applied to the handle is transmitted to the shaft while permitting limited rocking movement of the handle toward and from the body; a pair of cooperating stationary and movable annular brake elements encircling the shaft between the handle and the body, the stationary brake element being fixed with respect to the body; a splined driving connection between the movable brake element and the shaft constraining the same to turn in unison while permitting the movable brake element to move axially of the shaft toward and from the stationary brake element; said brake elements having mutually engageable braking surfaces brought into engagement by endwise movement of the movable element toward the stationary element; the movable brake element having a surface facing the pivotal connection between the handle and the projecting end of the shaft; a lobe-like cam on the handle bearing on said surface of the movable brake element on the other side of the shaft from the handle so that rocking movement of the handle away from the body moves the lobe-like cam toward the body and hence presses the movable brake element into braking engagement with the stationary brake element; and a brake engaging spring reacting between the body and the handle to at all times yieldingly urge the handle about its pivotal connection with the shaft in the direction to swing its lobe-like cam toward the body, said spring being readily overcome to free the shaft for rotation by slight pressure upon the handle preparatory to manipulation thereof.

4. In a device of the type in which a shaft which is journaled in a body but is constrained against axial movement with respect to the body and has an end portion projecting from the body may be rotated by means of a handle, means for readily releasably locking the shaft against rotation away from any position of adjustment at which it may be set, comprising: a pivotal connection between the handle and said end portion of the shaft by which torque applied to the handle is transmitted to the shaft while permitting limited rocking movement of the handle toward and from the body; a pair of cooperating stationary and movable annular brake elements encircling the shaft between the handle and the body; the stationary brake element being fixed with respect to the body; a splined driving connection between the movable brake element and the shaft constraining the same to turn in unison while permitting the movable brake element to move axially of the shaft toward and from the stationary brake element; said brake elements having mutually engageable braking surfaces brought into engagement by endwise movement of the movable element toward the stationary element; a connection between the handle and the movable brake element through which movement of the handle away from the body about its pivotal connection with the shaft forces the movable brake element into braking engagement with the stationary brake element; a brake engaging spring reacting between the body and the handle and yieldingly biasing the handle away from the body to normally maintain the brake elements in engagement, said spring being readily overcome to free the shaft for rotation by slight pressure upon the handle preparatory to manipulation thereof; and a brake releasing spring reacting between the body and the movble brake element to at all times yieldingly urge the movable brake element away from the stationary brake element, said brake releasing spring being annular and encircling the shaft and having an undulated formation so that the spring force applied upon the movable brake element is balanced at opposite sides of the shaft, said brake releasing spring being overpowered by the brake engaging spring.

References Cited in the file of this patent

UNITED STATES PATENTS

| | | |
|---|---|---|
| 496,967 | Archer | May 9, 1893 |
| 620,124 | Hassis | Feb. 28, 1899 |
| 1,131,224 | Ellwood | Mar. 9, 1915 |
| 1,162,935 | Lange | Dec. 7, 1915 |
| 1,324,817 | Harris | Dec. 16, 1919 |
| 2,509,271 | Jeffery | May 30, 1950 |
| 2,561,482 | Schostak | July 24, 1951 |
| 2,567,035 | Setka | Sept. 4, 1951 |
| 2,573,939 | Verville | Nov. 6, 1951 |

FOREIGN PATENTS

| | | |
|---|---|---|
| 220,590 | Germany | Apr. 2, 1910 |
| 421,738 | France | Mar. 3, 1911 |